(12) United States Patent
Letzkus et al.

(10) Patent No.: US 7,918,380 B1
(45) Date of Patent: Apr. 5, 2011

(54) METHOD AND APPARATUS FOR MANUFACTURING WELDED TAPERED TUBES

(76) Inventors: Kenneth R. Letzkus, Beaver Falls, PA (US); George Finkelshteyn, Richmond Heights, OH (US)

(*) Notice: Subject to any disclaimer, the term of this patent is extended or adjusted under 35 U.S.C. 154(b) by 0 days.

(21) Appl. No.: 12/708,039

(22) Filed: Feb. 18, 2010

(51) Int. Cl.
*B23K 31/02* (2006.01)
*B23K 37/00* (2006.01)
*B23K 13/02* (2006.01)

(52) U.S. Cl. ......... 228/156; 228/17; 228/17.5; 228/158; 228/173.6; 219/607; 219/612; 219/614

(58) Field of Classification Search .................. None
See application file for complete search history.

(56) References Cited

U.S. PATENT DOCUMENTS

| | | | | |
|---|---|---|---|---|
| 3,452,424 A | * | 7/1969 | Morris | 228/147 |
| 3,648,008 A | | 3/1972 | Kawato et al. | |
| 3,802,239 A | | 4/1974 | Karmann et al. | |
| 3,920,173 A | * | 11/1975 | Salata | 228/147 |
| 3,945,552 A | * | 3/1976 | Tobita et al. | 228/17.5 |
| 4,846,392 A | * | 7/1989 | Hinshaw | 228/147 |
| 6,629,632 B1 | | 10/2003 | Jack et al. | |
| 7,296,450 B2 | | 11/2007 | Kuroda et al. | |
| 2008/0230586 A1 | * | 9/2008 | Kenmochi et al. | 228/144 |

* cited by examiner

*Primary Examiner* — Kiley Stoner
(74) *Attorney, Agent, or Firm* — Howard M. Cohn (57) ABSTRACT

A tapered tube manufacturing apparatus and method of operation comprises an entry station adapted to receive a tapered tube having an open, longitudinal seam with spaced longitudinal edges extending the length of the tapered tube. A feed line section moves the tapered tube from the entry section into a welding station while maintaining the longitudinal seam coincident with a pass center line which defines a direction of movement of the tapered tube through the entry station, the feed line section and the welding station. A pair of squeeze rolls in the welding station move the tapered tube through the welding station where the edges of the seam are heated, squeezing the open seam closed for welding the edges of the seam together, and then move the welded tapered tube into a cooling and transition station while maintaining the welded seam coincident with the pass center line. A pair of sizing rolls move the welded tapered tube from the cooling and transition station and through the sizing station so that a centerline extending longitudinally through the center of the welded tapered tube is coincident with the direction of movement of the welded tapered tube through the sizing station and the welded tapered tube is squeezed so that all cross sections of the welded tapered tube that are perpendicular to the centerline at any point along the length of tube, have the same shape.

20 Claims, 10 Drawing Sheets

METHOD AND APPARATUS FOR MANUFACTURING WELDED TAPERED TUBES

FIELD OF THE INVENTION

The invention relates to the manufacture of welded tapered tubes and more particularly to the manufacture of welded tapered tubes having a longitudinal seam.

BACKGROUND OF THE INVENTION

The present invention relates to the apparatus and process for making an expanded variety of tapered tube sections from formed sheet metal and completed by welding-sizing apparatus of this invention. More specifically, the present invention is a group of apparatuses and processes with intent for welding by electrical resistance method and rolling the welded tube section through sizing apparatus with no means of mandrel or any other internal tool.

It is known in the traditional technology to manufacture tapered tube sections by forming a metal blank which is cut to trapezoidal geometry' out of plate or sheet metal into a conical tube shape and then welding the opposite edges (long side) of the formed blank by an electrical welding method well known as a high frequency welding. However, none of the known methods or apparatus is practical and efficient in operation and pose limitations in terms of tapered tube products geometry such as lengths, diameters or shapes which are to be manufactured. The number of the known apparatuses for manufacturing tapered tube sections in reality is represented by only one particular process. For example, forming, welding or finishing (rolling, burnishing) and some accessories to each one individually. Such disconnects make those apparatuses limited by application.

One example of such prior art practice is found in U.S. Pat. No. 6,629,632 issued to R. Jack and J. Brook and is shown in FIGS. 17 and 18. This invention consists of a "means for applying inwardly directed radial forces to the shaft at a plurality of discrete points on the surface of the shaft [comprising] a plurality of pressure rollers defining an opening through which the shaft is fed, and means for varying the positions of the rollers[.]" One disadvantage of this apparatus and method is the limitation of cross sections to be welded in stable conditions. In other words, when space between rollers grows, material of the tapered tube section will be deformed between rollers under pressure that are intended to be used mostly to create welding fusion. The tapered tube section will be distorted, with increasing distortion toward the larger diameter of the tapered section and exhibit weld defects as well. A second disadvantage of U.S. Pat. No. 6,629,632 is the absence of a secondary operation such as finishing that is required to fix shape discrepancy of the tapered tube section.

Another example of such prior art practice is found in U.S. Pat. No. 3,648,008 issued to T. Kawato et al. Shown is welding apparatus in which "a preformed tapered tube is inserted between miniaturized forming rollers having cam faces . . . and as said tube is drawn . . . the welding is performed on a longitudinal aligned edges of the tube so as to make desired products by means of the comparatively small high-frequency welding apparatus." This type of roller is known as a "sleep roll" and ensures the tapered tube will be welded, but may not deliver desired shape, size or finishing process at the end.

The next example of such prior art practice is found in U.S. Pat. No. 3,802,239 issued to Karmann et al. This patent discloses an apparatus and process "for forming an elongated tapered tube for use as light poles and the like, the machine comprising means for supporting a flat, trapezoidal sheet of metal in a horizontal position, an elongated mandrel having the shape of the tube to be formed held down along the longitudinal axis of the sheet, a pair of forming elements mounted along each side and below the sheet with power means for raising the formers upwardly and moving them inwardly toward each other whereby to form the sheet about the mandrel, means for flattening the edges of the sheet such that they are contiguous for welding purposes, and means for removing the formed tube from the machine as another sheet is brought into the machine and placed on the supporting means." This prior art was proposed to finish welded tapered tube by a series of rollers that roll on the outside diameter of tapered lube with a mandrel inside. This type of finishing process required an internal tool along with extra steps to insert the mandrel into the tapered tube and mandrel extraction at the end of the operation. This process will require significant modification to be operated in line with welding apparatus. In addition, because of stretch, the tapered tube will increase in length while the thickness of the tube will decrease.

An additional example of a sizing or finishing practice is found in U.S. Pat. No. 7,296,450 issued to Y. Kuroda. Shown is a "production apparatus for a tapered steel pipe which holds the two ends of the steel pipe by shafts on carriers and moves it in the axial direction while rotating it to draw it to a taper by an intermediate working roll, wherein the shaft of the working roll is inclined 20 to 40 degrees with respect to the axis of the steel pipe and a roll caliber of the working roll is made an outwardly curved surface with little difference in roll peripheral speed; the face plate for mounting the working roll is positioned and supported with respect to the body by a hinge mechanism and is fastened to the body by fastening members; and the bearing of the working roll at the side close to the steel pipe is made smaller than the bearing at the side far from the steel pipe and the two bearings are connected by a tie-rod." The process has a great deal of limitations as far as tapered tube diameter, shape and length and is extremely dependent upon the wall thickness of the straight tube.

Metal tapered tube product is well known and used as a utility supporting structure in infrastructure, communications and street lighting.

ASPECTS OF THE INVENTION

An aspect of the present invention includes providing an improved method and apparatus for manufacturing welded tapered tubes.

A further aspect of the present invention is to provide a metal tapered tube section welding and sizing manufacturing apparatus and process which enables varying 3-D machine geometry in each cycle.

A still further aspect of the present invention is to provide a metal tapered tube section welding and sizing manufacturing apparatus which addresses varying geometry tolerances in the metal blank from which the tapered tube section is made.

A yet further aspect of the present invention is to provide a metal, tapered tube section welding and sizing apparatus and process which addresses varying geometry tolerances in the formed tube piece during forming from the cut metal blank.

Another aspect of the present invention is to provide a metal tapered tube section manufacturing apparatus and process which identifies welding and sizing tooling of the roller position at a registered tapered tube section position.

Still another aspect of the present invention is to provide a metal tapered tube section welding and sizing manufacturing apparatus and process which identifies universal tube position for welding or sizing.

A still further aspect of the present invention is to provide a metal tapered tube section welding and sizing manufacturing apparatus and process which generates forces to close the formed tube piece, originates the weld joint by an electrical resistance weld method and moves the tube section from one end to the other end by powered rolls only and tooling geometry to thereby provide superior weld quality and final shape.

A further aspect of the present invention is to provide an improved welding apparatus and process in conjunction with sizing apparatus and process which accomplishes more than one or all of the above-listed aspects including those obvious to one of skill in the art.

An aspect of the present invention relates to a method and apparatus for manufacturing welded tapered tubes which integrates several processes such as welding and finishing, i.e. sizing. This integration will ensure that the finished product meets the design specifications and is of the highest quality. Moreover, it allows for a wide range of diversity in its application.

Another aspect of the present invention relates to the use of one reference line through the tapered tube section in two different manufacturing sequences by two different apparatuses.

Still another aspect of the present invention relates to a method and apparatus for manufacturing welded tapered tubes in a manufacturing line incorporating the two processes of welding and sizing. This tandem combination of processes enables the finalization of the post-welding shape of the tapered tube section immediately after welding without the need for an internal tool to shape the tube section.

A further aspect of the present invention relates to a processing tool for manufacturing welded tapered tubes which, because of its simplicity of construction, makes it easy to replace, expand and use in universal ways in welding and sizing apparatuses.

A still further aspect of the present invention is the use of original equations to make the processing tool for manufacturing welded tapered tubes easy to size and manufacture. In addition, those equations become a versatile tool to engineer the processing tool for manufacturing welded tapered tubes regardless of scale or application.

SUMMARY OF THE INVENTION

This invention provides an improved apparatus and process for welding tapered tube sections of different shapes and sizes from previously formed shells from flat metal of different gauges by using solid state electrical resistance welding method. This invention provides a novel apparatus and process for sizing and finishing in line with improved welding apparatus that will guarantee proper roundness with close round tolerances to the tapered tube sections. The sizing process is based upon "squeezing" the tapered tube section past its yield strength to give the tapered tube section required roundness at close round tolerances.

According to the present invention, a tapered tube manufacturing apparatus, comprises an entry station adapted to receive a tapered tube having an open, longitudinal seam with spaced longitudinal edges extending the length of the tapered tube; a feed line section moving the tapered tube from the entry section into a welding station while maintaining the longitudinal seam coincident with a pass center line (PCL) which defines a direction of movement of the tapered tube through the entry station, the feed line section and the welding station; a pair of squeeze rolls in the welding station for moving the tapered tube through the welding station where the edges of the seam are heated, squeezing the open seam closed for welding the edges of the seam together, and moving the welded tapered tube into a cooling and transition station while maintaining the welded seam coincident with the pass center line (PCL); and a pair of sizing rolls for moving the welded tapered tube from the cooling and transition station and through the sizing station so that a centerline (CL) extending longitudinally through the center of the welded tapered tube is coincident with the direction of movement of the welded tapered tube through the sizing station and the welded tapered tube is squeezed so that all cross sections of the welded tapered tube that are perpendicular to the centerline (CL) at any point along the length of tube, have the same shape.

According to the present invention, a tapered tube manufacturing apparatus comprises a series of stations, including an entry station, a feed line section, a welding station, a cooling and transition station, and a sizing station.

Further according to the present invention, the initial station, an entry station, is adapted to receive a tapered tube with a longitudinal seam extending the length of the tube. The entry station may include a pusher mechanism for pushing the tapered tube into squeeze rolls at the subsequent welding station. The entry station may also include a conveyor to support the tapered tube as it moves toward the feed line section.

Still further according to the present invention, the next station, the feed line section, moves the tapered tube from the entry station toward the welding station while keeping the seam coincident with a pass center line that delineates the direction of movement of the tapered tube through the various stations. The feed line section may include a fin plate approximately as long as the tube disposed between the open edges of the seam to maintain the position of the seam relative to the pass center line. The fin plate can also include a flange disposed within the tapered tube to support it along its length.

Also according to the present invention, the next station, the welding station, includes an induction heating system for heating the edges of the open longitudinal seam. The welding station also has a pair of squeeze rolls to squeeze the seam together to seal the edges as they are welded together and to move the tapered tube into a cooling and transition station. Each of the squeeze rolls may have tooling located around its circumference forming a radial contour in a mirror arrangement of the opposite squeeze roll. The size of the radial contour itself may change to accommodate the shape and size of individual tapered tubes. In general the radial contours of the master plate create a circular opening with a diameter approximately 94% to 98% of a diameter through the tapered tube section.

Moreover according to the present invention, the next station, a cooling and transition station may feature a clamp cart to support an end of the welded tapered tube section. It may also include a pusher plate to push the tube forward and a support roll to elevate the welded tapered tube such that the longitudinal center line through the length of the tube aligns with the line of movement of the tube through the tube manufacturing apparatus.

According to the present invention, the next station, a sizing station includes a pair of sizing rolls that move the tapered tube along from the cooling and transition station, such that the center line extending longitudinally through the center of the welded tapered tube is coincident with the direction of movement of the welded tapered tube through the sizing station. As with the squeeze rolls, the sizing rolls may have tooling located around its circumference forming a radial contour in a mirror arrangement of the opposite squeeze roll and the size of the radial contour may change to accommodate the shape and size of individual tapered tubes.

The invention also includes a method for manufacturing a tapered tube including the steps of moving a tapered tube having an open longitudinal seam with spaced longitudinal edges extending the length of the tapered tube through an entry station. Then, the tapered tube is moved from the entry section into a welding station while maintain the open longitudinal seam of the tapered tube coincident with a pass center line (PCL) which defines the direction of movement of the tapered tube through the entry station and the welding station. Next, the open seam is squeezed closed and the edges of the seam are welded together. Then, the welded tapered tube is moved through a cooling and transition station while maintaining the movement of the welded tapered tube so that the welded seam is coincident with the pass center line (PCL). Next, the welded tapered tube is moved through a sizing station so that a centerline (CL) extending longitudinally through the center of the welded tapered tube is coincident with the direction of movement of the tapered tube through the sizing station. Next, the welded tapered tube is squeezed in the sizing station so that a cross section of the welded tapered tube that is perpendicular to the centerline (CL) at any point along the length of tube is circular.

DESCRIPTION OF THE DRAWINGS

The structure, operation, and advantages of the present invention will become further apparent upon consideration of the following description taken in conjunction with the accompanying figures (FIGs.). The figures are intended to be illustrative, not limiting. Certain elements in some of the figures may be omitted, or illustrated not-to-scale, for illustrative clarity. The cross-sectional views may be in the form of "slices", or "near-sighted" cross-sectional views, omitting certain background lines which would otherwise be visible in a "true" cross-sectional view, for illustrative clarity.

If shading or cross-hatching is used, it is intended to be of use in distinguishing one element from another (such as a cross-hatched element from a neighboring un-shaded element. It should be understood that it is not intended to limit the disclosure due to shading or cross-hatching in the drawing figures.

Elements of the figures may (or may not) be numbered as follows. The most significant digits (hundreds) of the reference number correspond to the figure number. For example, elements of FIG. 1 are typically numbered in the range of 100-199, and elements of FIG. 2 are typically numbered in the range of 200-299. Similar elements throughout the figures may be referred to by similar reference numerals. For example, the element 199 in FIG. 1 may be similar (and possibly identical) to the element 299 in FIG. 2. Throughout the figures, each of a plurality of elements 199 may be referred to individually as 199a, 199b, 199c, etc. Such relationships, if any, between similar elements in the same or different figures will become apparent throughout the specification, including, if applicable, in the claims and abstract.

In the drawings accompanying the description that follows, both reference numerals and legends (labels, text descriptions) may be used to identify elements. If legends are provided, they are intended merely as an aid to the reader, and should not in any way be interpreted as limiting.

DESCRIPTION OF THE PREFERRED EMBODIMENT

In the description that follows, numerous details are set forth in order to provide a thorough understanding of the present invention. It will be appreciated by those skilled in the art that variations of these specific details are possible while still achieving the results of the present invention. Well-known processing steps and materials are generally not described in detail in order to avoid unnecessarily obfuscating the description of the present invention.

In the description that follows, exemplary dimensions may be presented for an illustrative embodiment of the invention. The dimensions should not be interpreted as limiting. They are included to provide a sense of proportion. Generally speaking, it is the relationship between various elements, where they are located, their contrasting compositions, and sometimes their relative sizes that is of significance.

Figure 1:
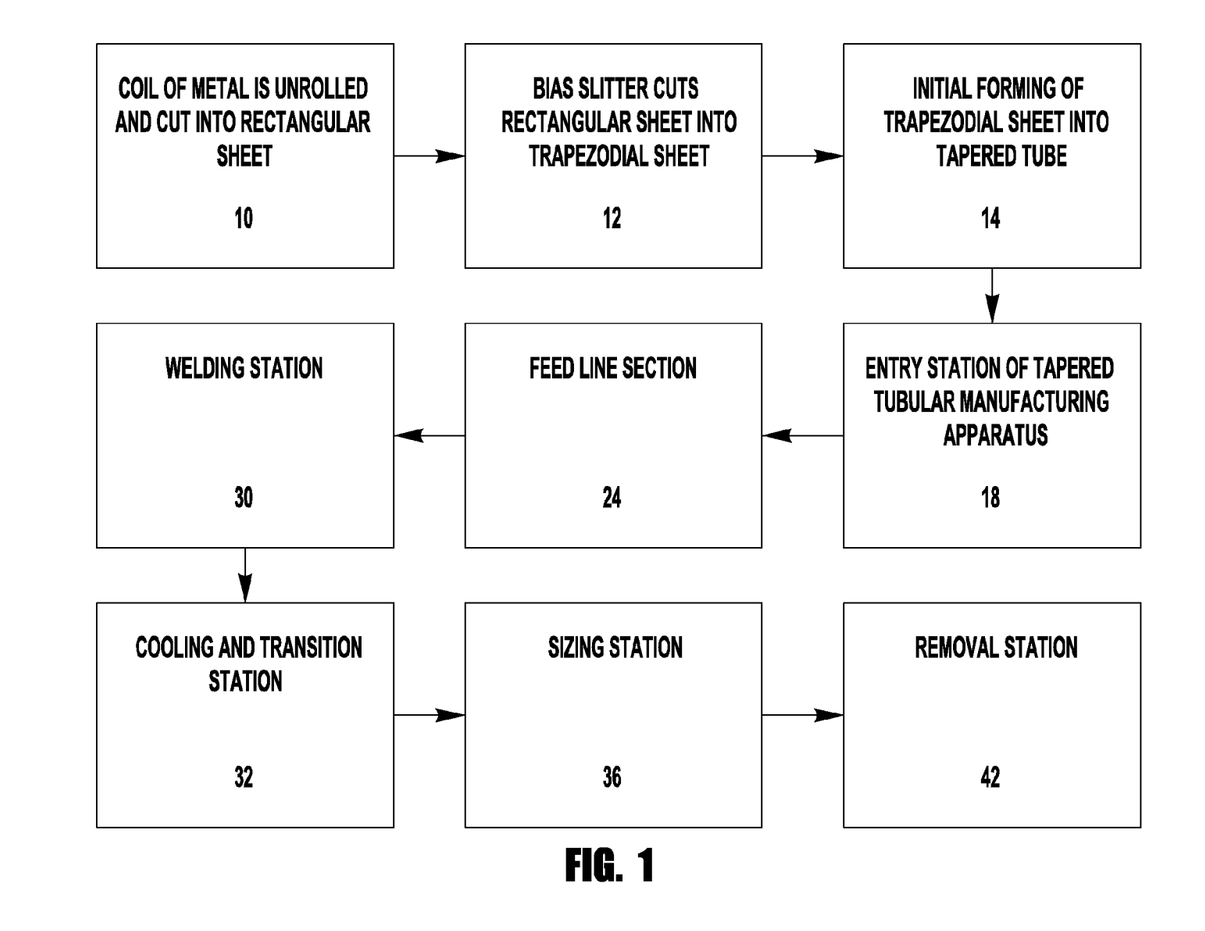
FIG. 1 shows the steps that to change a coil of metal into a tapered tube, according to the present invention.
Figure 2:
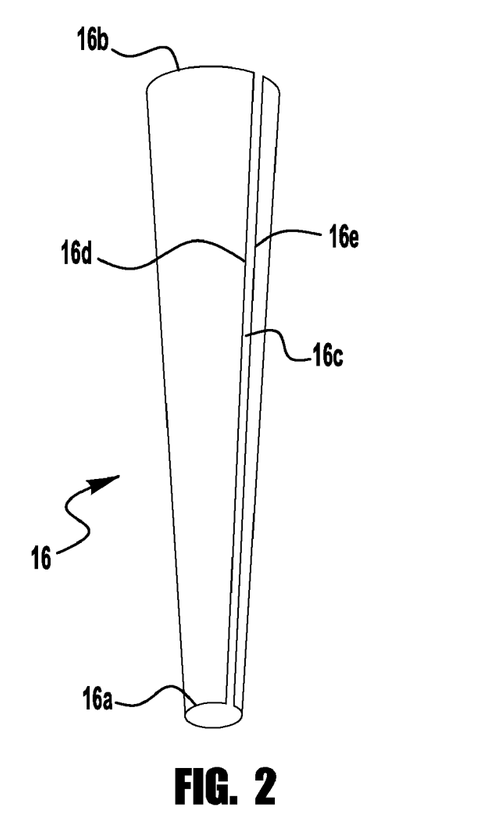
FIG. 2 shows a tapered tube section with an open seam, according to the present invention.

Referring to FIG. 1, there is shown the steps that are necessary to change a coil of metal into a tapered tube having a circular "C" shape cross section. First, in step 10, a coil of metal (not shown) is unrolled, flattened and cut into a rectangular sheet. Next in step 12, a bias slitter cuts rectangular sheet into a trapezoidal shaped sheet. Then, in step 14, the trapezoidal sheet is initially formed into a tapered tube 16, as illustrated in FIG. 2. Continuing, in step 18, the tapered tube is fed into the entry station 20 of a tapered tube manufacturing apparatus 22. Then, in step 24 the tapered tube is moved through a feed line section 26 towards the welding station 28.

Figure 7:
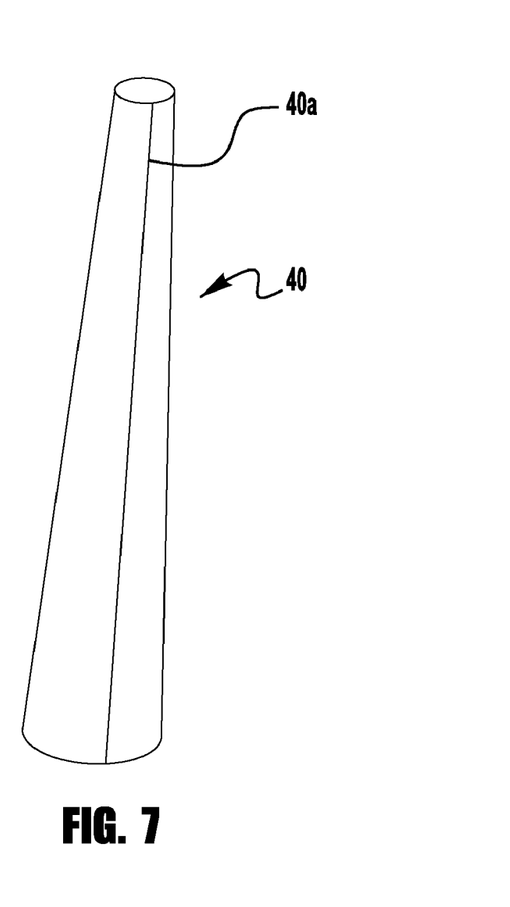
FIG. 7 shows a welded tapered tube section, according to the present invention.

In step 30, the tapered tube 16 is welded in the welding station 28. In step 32 the welded tube is directed through a cooling and transition station 34. Then in step 36, the welded tube passes through a sizing station 38 to form the final welded tapered tube 40 as shown in FIG. 7.

Figure 3:
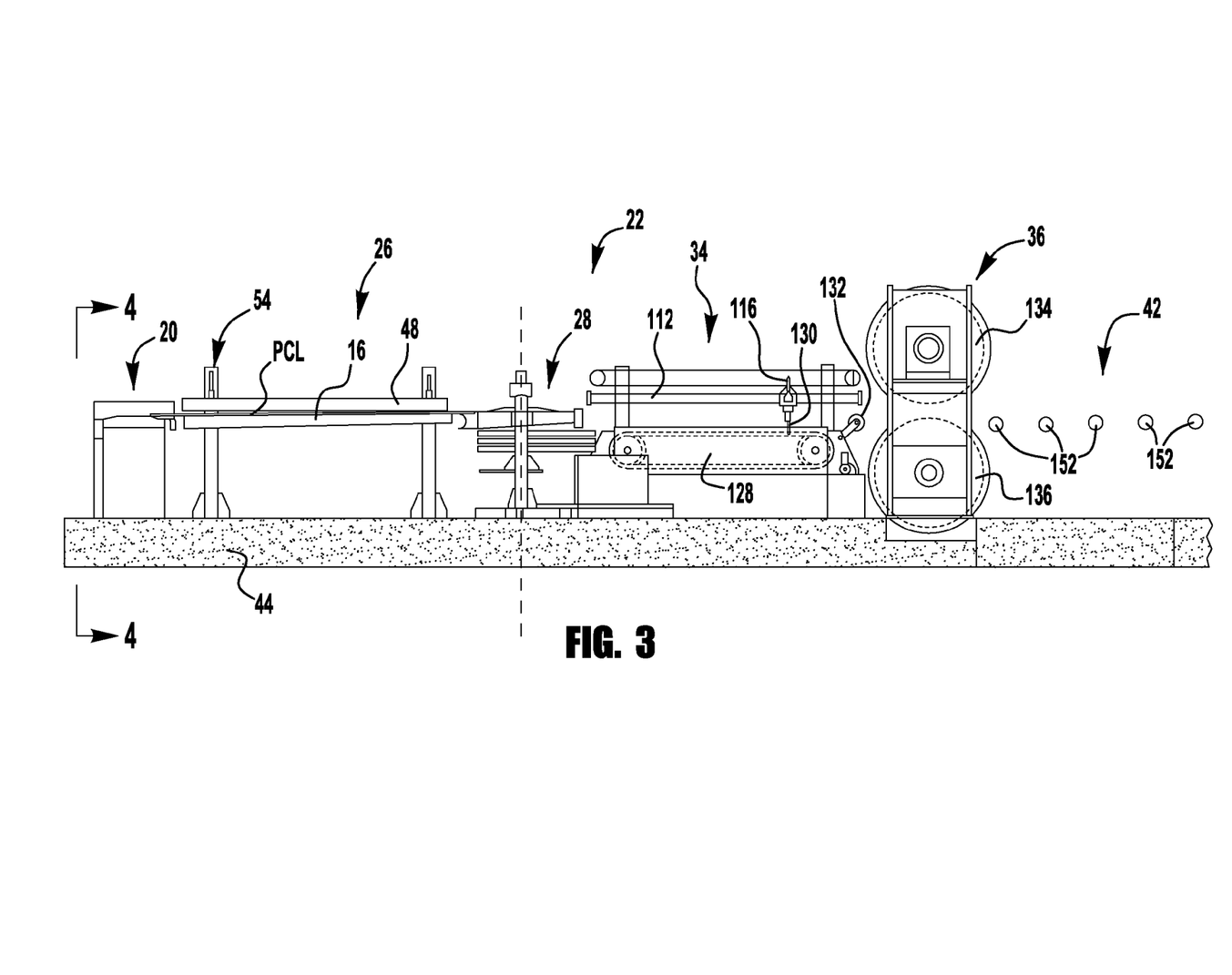
FIG. 3 shows a tapered tube manufacturing apparatus, according to the present invention.

The operations described with respect to FIG. 1 are performed on a tapered tube manufacturing apparatus 22, as shown in FIG. 3. The tapered tube manufacturing apparatus 22 includes an entry station 20, shown in more detail in FIG. 4, a feed line section 26, a welding station 28 (shown in more detail in FIG. 5), a cooling and transition station 34, a sizing station 36 (shown in FIG. 6), and a removal station 42, all of which are affixed to a manufacturing floor 44 with individual bases and frame structures, as discussed hereinafter.

The tapered tube manufacturing apparatus 22 takes a preformed piece of metal 16, generally in the circular "C" shape (see FIG. 2) and forms, welds and sizes it into a welded tapered tube section 40 (see FIG. 7) having a round cross section with close round tolerances. In general, the entire process is as follows. In step 10, coils of metal (not shown) are unrolled and flattened or leveled as is well known in the art. These flattened sections of metal are then cut to length as is well known in the art. In step 12, a bias slitter (not shown) is used to cut the rectangular piece of metal into a trapezoidal piece (not shown) as is also well known in the art. The process flow through the tapered tube manufacturing apparatus 22 is dependent on travel of the tapered tube section 16 starting from the small end diameter 16a to the large end 16b. An initial forming station (not shown) employs a forming press or folding press or roll forming unit to bend the trapezoid into a frustoconical tapered tube 16 having generally circular "C" shape, as is also well known in the art. This forms a seam or slot 16c between the longitudinal edges 16d and 16e extending the length of tapered tube section 16. The welding station 28 then pulls the conical "C"-shaped tapered tube section 16 to be formed into a closed "O" or circular shape with a following fusion of the longitudinal edges 16d, 16e preheated up to 2,500 degrees F. The closed "O" shaped tapered tube section 16 is then transported to a cooling and transition station, where the weld joint is cooled and stiffens and the section is reoriented in relation to a centerline (CL) through the closed "O" shaped tapered tube section 16. To continue the process, the welded tapered tube section, typically with slightly misshapen shape travels to a sizing station 36 to be formed into a desired roundness with close tolerances.

Figure 4:
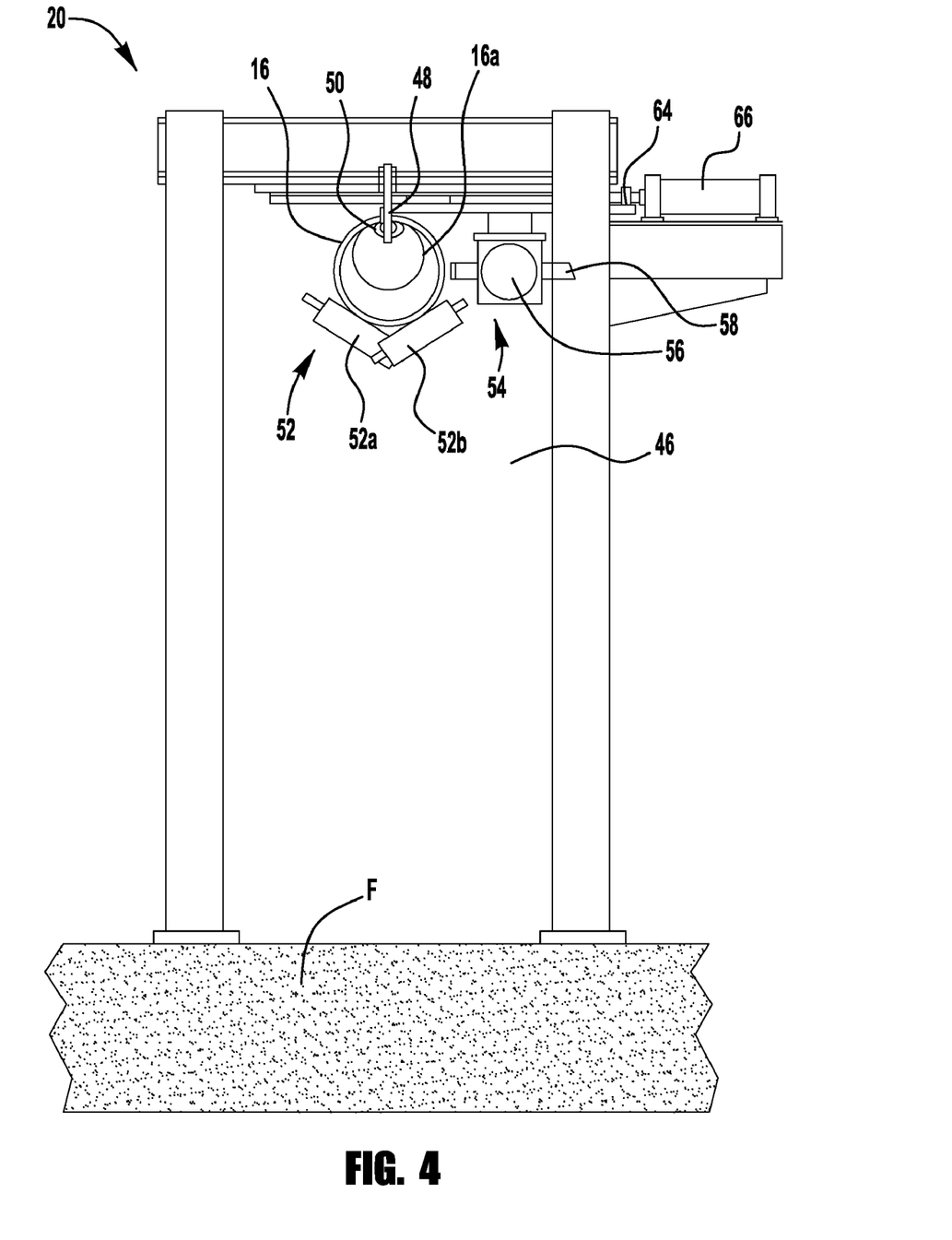
FIG. 4 shows an entry station of the tapered tube manufacturing apparatus, according to the present invention.

The entry station 20, as best shown in FIGS. 3-4 includes roller conveyer 52 and a pusher mechanism 54, and is adapted to receive the tapered tube section 16 and direct it toward the feed line section 26.

The feed line section 26, shown in FIGS. 3 and 4, includes a suspended fin plate 48 which is intended to maintain the initial Pass Centerline (PCL) of the tapered tube section 16 and center position of the seam 16c as well. As the tapered tube section moves through the feed line section 26, the seam 16c extending the length of the tube is disposed about the elongated fin plate 48, shown to be as long as the tube 16, having a flange 50 at one end. The flange 50 is disposed within the tube and ensures that the tube is supported along its length so that the PCL through the seam 16c remains parallel to the floor. In addition, the small end 16a of the tube 16 is fed into the opening before the larger end 16b. Note that the tube 16 is supported by the flange 50 and directed in a desired direction by the fin plate 48. To help the tube 16 move, a roller conveyer 52 (shown for example as two rollers 52a, 52b arranged at an angle to each other) supports the tube section 16.

Note that the initial PCL extends longitudinally along the seam or slot 16c and is parallel to direction of movement of the tapered tube 16 through the tapered tube manufacturing apparatus 22.

Moving the un-welded tube section 16 so that the PCL is parallel to the direction of movement enables for ease in movement of the tube section 16 because it can be moved with the edge of the slots parallel to the direction of movement and the manufacturing floor 44. This is particularly useful when the tube section is moved though the welding section, as discussed below.

Referring to FIGS. 3 and 4, a tapered tube 16 is fed through the central opening 46 of the entry station 20 and into a feed line section 26. The pusher mechanism 54 shown in FIG. 4 includes a long stroke air cylinder 56, which mounts to the slide 58. As the formed tapered tube section 16 travels toward the squeeze rolls 60, 62 (See FIG. 5), the long stroke air cylinder 56 remains in an initial, at home position, as shown. As soon as the end 16b of the formed tube section 16 clears the area of the pusher mechanism 54, slide 64 carrying long stroke air cylinder 56, will be moved toward the centerline of tube manufacturing apparatus 22, i.e. towards the fin plate 48 by air cylinder 66. The air cylinder moves between two control positions (the home position and the centerline of tube manufacturing apparatus 22). At centerline position, cylinder 56 will be activated to push the end 16b of the tapered tube section 16 into the squeeze rolls 60 and 62, as discussed hereinafter and will keep pressure on the end section 16b until the welding process is activated. As soon as the formed section is being pulled by the squeeze rolls 60, 62, the pusher arm 64 of air cylinder 66 will be retracted back to home position, as shown in FIG. 4.

Figure 5:
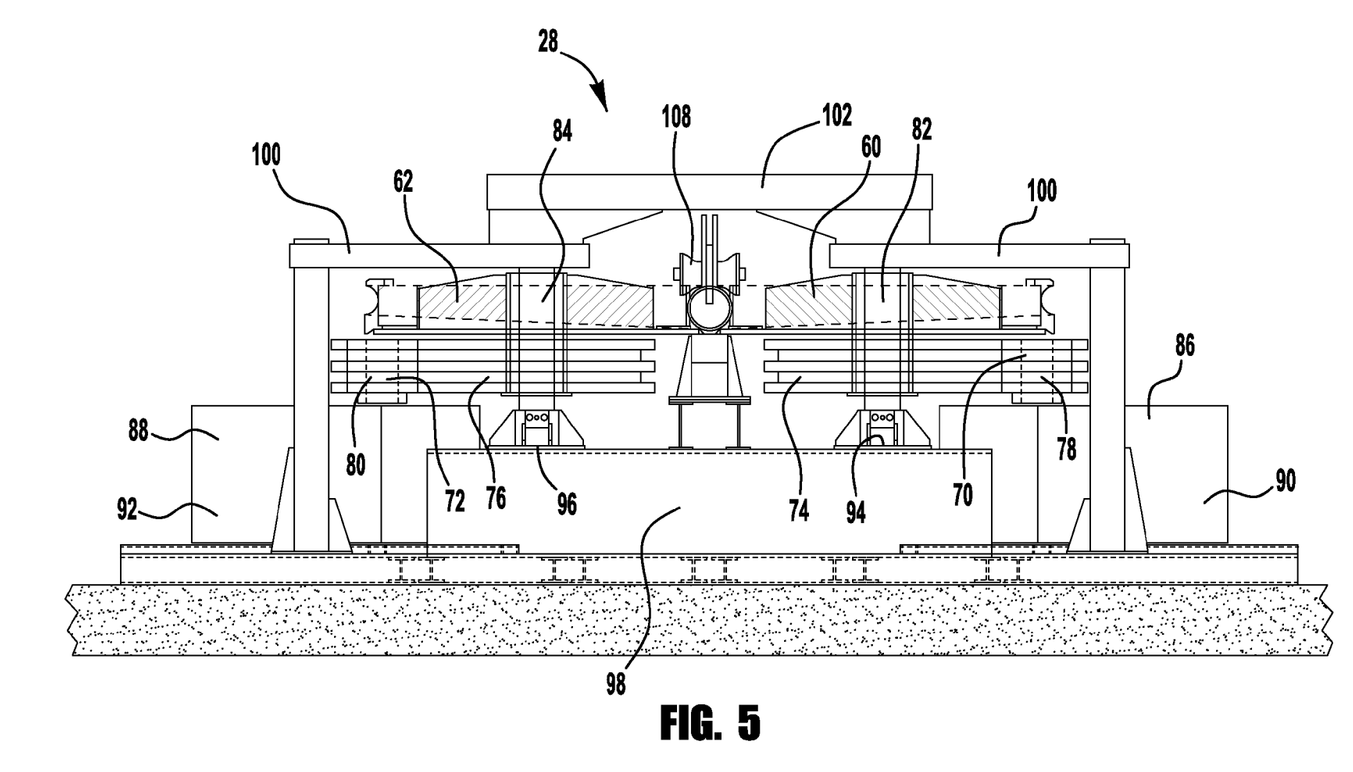
FIG. 5 shows a welding station, according to the present invention.

Welding station 28, as best shown in FIGS. 3 and 5 includes two squeeze rolls 60 and 62 individually driven by chains 70, 72, respectively, which connects driven sprockets 74, 76, respectively, and drive sprockets 78, 80, respectively. The driven sprockets 74, 76 are attached to the bottom of squeeze rolls 60, 62, respectively, through a shaft 82, 84, respectively. Drive sprockets 78, 80 are mounted to the output shaft of gear reducers 86, 88, respectively, which in turn are driven by electrical motors 90, 92. Both assemblies of gear reducers 86, 88 and motors 90, 92 are controlled and synchronized electronically to ensure the same torque, speed, and proper angular position of the diameters of the squeeze rolls 60, 62 and the "squeeze" of the edges 16d, 16e of the seam 16c after the edges having been heated by an induction heating system (see FIG. 5A) for proper welding. Besides squeezing the edges 16d, 16e of the tube 16 together, the squeeze rolls 60, 62 grip the tube and pull it from the feedline section 26 and directs the welded tube 40 into the cooling and transition station 34.

Rollers 60, 62 and driven sprockets 74, 76 are bearing-mounted on the shafts 82, 84. The shafts 82, 84 are fixed through the bottom mounting brackets 94, 96, respectively, are affixed to the welding station base 98. At the top end, shafts 82, 84 are affixed to the overhead structures 100. Overhead structures 100 are also affixed to the welding station base 98. The overhead bridge platform 102 acts as a master base for the electrical resistance welding unit 104, that is mounted over the top of both squeeze rolls 60, 62 close to the center line though direction of movement through the tapered tube manufacturing apparatus 22.

Figure 5A:
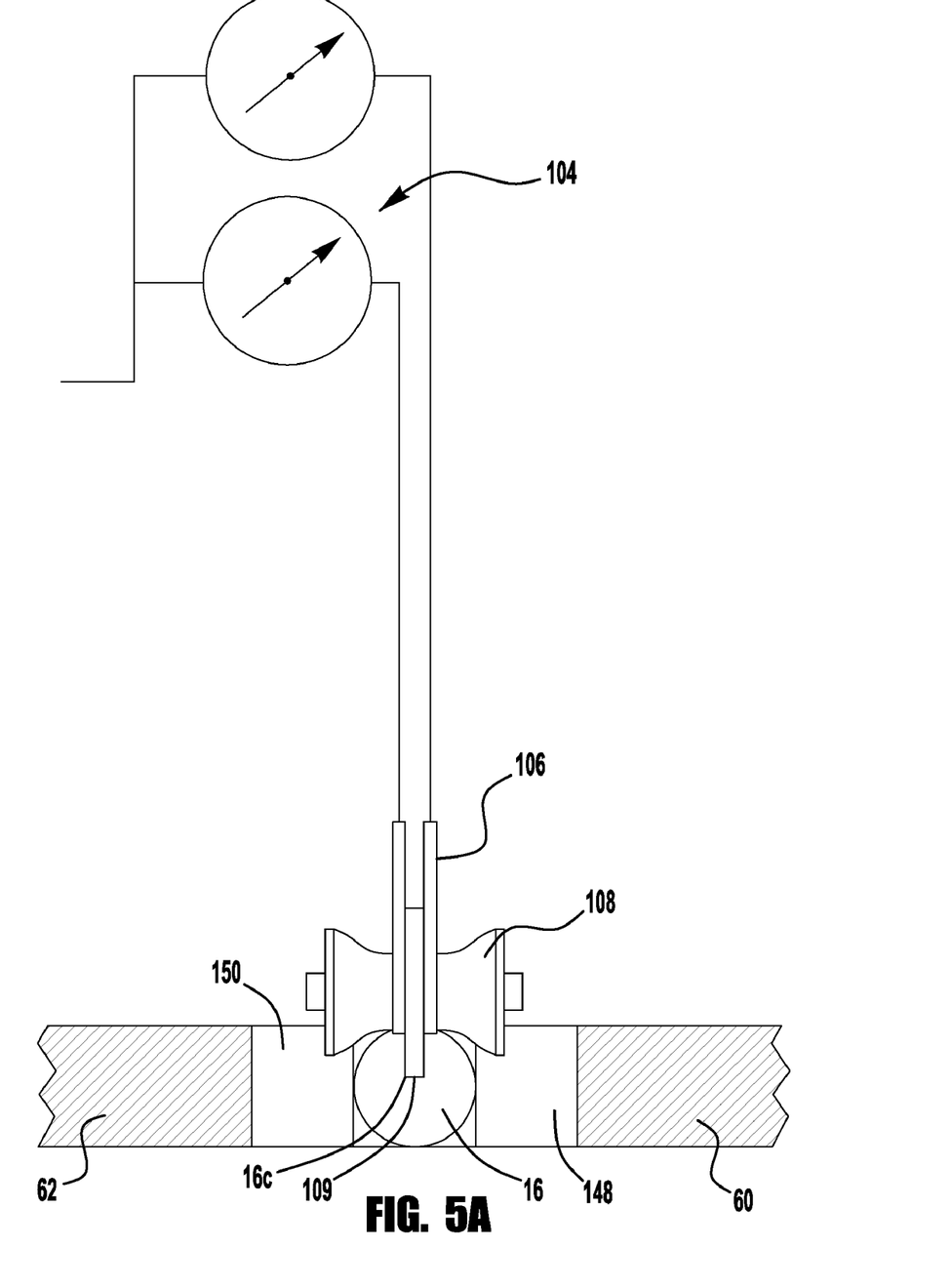
FIG. 5A shows the details of the welding station.

As shown in FIG. 5A, the weld contacts 106 are suspended from weld unit 104 and are separated to be aligned with the edges of the seam 16c of the tapered tube section 16. Weld contacts 106 will ride on top of the metal edges 16c of the split seam of tapered tube section 16 ahead of squeeze rolls 60, 62 during welding. The weld contacts 106 have a mechanism to raise or lower them toward the seam 16c to be welded and a fine adjustment mechanism can be included across the centerline of the tapered tube manufacturing apparatus 22.

A seam guide roll assembly 108 will be mounted off the structural support frame which is affixed to the bridge 102 and will be located in front of the two squeeze rolls 60, 62 so that the weld contacts 106 are between the seam guide roll assembly 108 and the squeeze rolls 60, 62. The seam guide roll assembly 108 includes a lip 109 disposed through the seam 16c of the tube 16 that ensures the proper presentation of the tube into the squeeze rolls 60, 62.

Immediately following the weld station 28, an outside diameter (OD) trim assembly (not shown) can be provided to cut the red-hot outside bead resulting from the "squeeze"/welding operation. The OD trim assembly can be affixed to the overhead bridge 102. The trim will be accumulated on a winding mechanism from which it will be removed as needed. The welding of the tapered tube section 16 will be performed with its top surface in a horizontal position The PCL, see FIG. 1, the position of the seam guide roll 108 and the OD trim assembly remain constant during the welding process.

The welded tapered tube section 40 (see FIG. 7) will move into a cooling and transition station 34 as shown in FIG. 3. The total length of station 34 will be longer than the longest tapered tube section being formed, to ensure that the tapered tube section leaves the squeeze rolls 60,62 of the welding station 28 before entering the sizing station 36 (see FIGS. 3 and 8).

Figure 8:
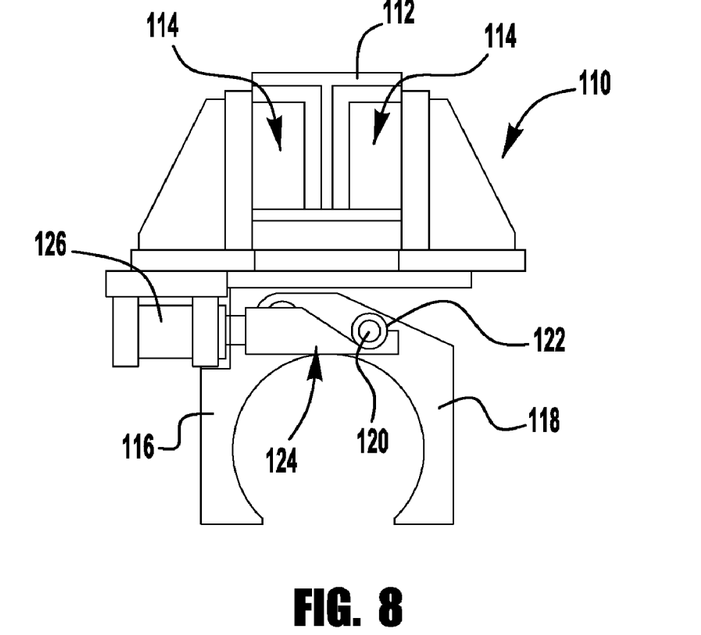
FIG. 8 shows a clamp cart which controls the small end of the tapered tube sections coming out of the weld apparatus with a release mechanism wherein the release mechanism is in a locking position, according to the present invention.

During the welding process, the small end 40a of the tapered tube section that was welded first will be moved into the cooling station 34 and will be self-clamped by a clamp cart 110 (See FIG. 8) that will freely travel with the welded tapered tube section 40 as the long section is being welded and the cooling process is occurring. The clamp cart assembly 110 is supported by beam 112 (FIG. 3). The clamp cart assembly 110 is shown in FIG. 8 and includes wheels 114 that ride on beam 112.

Figure 9:
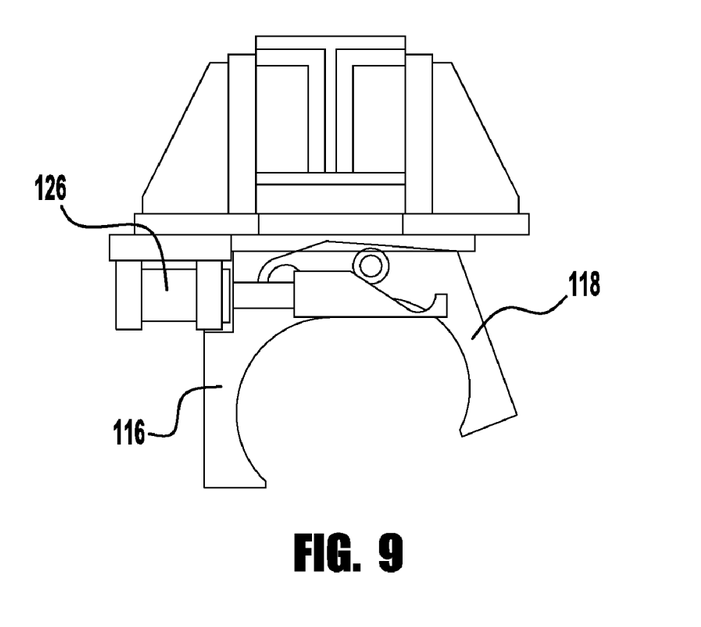
FIG. 9 shows a clamp cart which controls the small end of the tapered tube sections coming out of the weld apparatus with a release mechanism wherein the release mechanism is in a locking position, according to the present invention.

The shaped clamp tool 116 is bolted to the clamp cart 110. The shaped part 118 is attached to the part 116 by a hinge pin 24 and has a cam roller 122 attached thereto. Cam roller 122 is engaged by cam arm 124 which is connected to a cam arm air cylinder 126. As cam arm air cylinder 126 stays closed, the tapered tube section is clamped (FIG. 8). When the cam arm 124 is extended by the cam arm air cylinder 126 (FIG. 9), the shaped parts 116 and 118 will separate and the tapered tube section will be released as the welding operation is completed and clamp cart 110 is stopped. Meanwhile, the clamp cart 110 will be pushed back by chain mechanism 128 with a pusher plate 130 (FIG. 3) to be ready for the next tapered tube section. The chain mechanism 128 will return the pusher plate 130 to a pick up position.

After the welded tapered tube section 40 will rest on the chain conveyer 128 with a pusher plate attached, the chain conveyer 128 will push the tapered tube section forward to the sizing station 36. As soon as the welded tapered tube section 40 reaches support roll 132, see FIG. 3, the roll will elevate the welded tapered tube section 40 in a manner in which the movement of the tapered tube section will be so that the longitudinal "Center line" CL through the length of the welded tapered tube section 40 will align with the direction of movement of the welded tube section through the tapered tube manufacturing apparatus 22. This action will complete the transfer of the welded tube section 40 to the sizing station 36.

Chain conveyer 128 will continue to move the welded tapered tube section 40 (FIG. 7) toward sizing rolls 134, 136. As soon as the small end 40a of the welded tapered tube section 40 enters the rolls 134, 136, the support roll 132 (See FIG. 3) will lower to disengage from the bottom side of the welded tapered tube section 40. Sizing rolls 134, 136 are individually driven by gear motors 138, 140, respectively. The sizing rolls will grab and pull the welded tapered section 40 through the sizing station 36.

Figure 6:
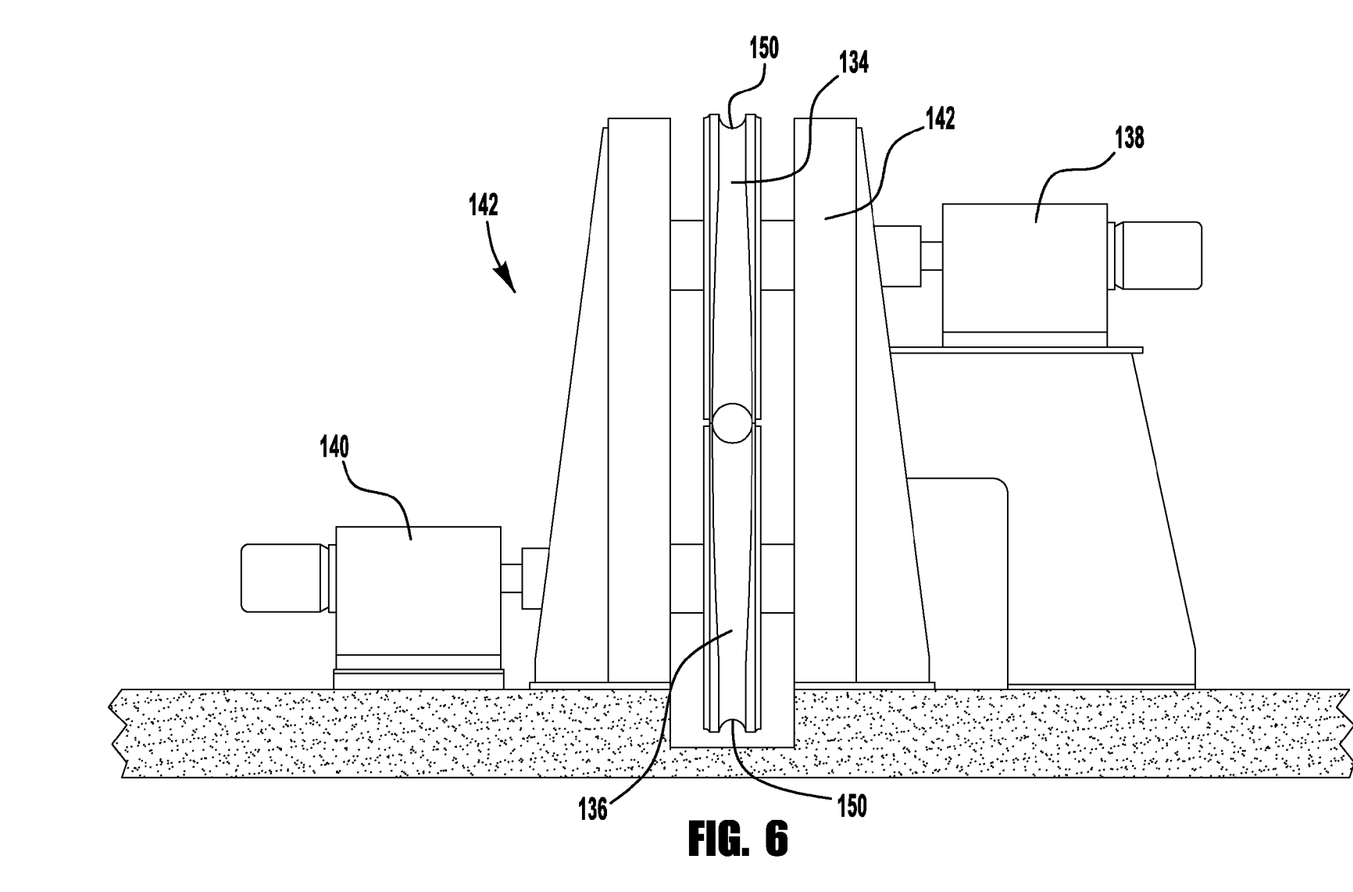
FIG. 6 shows a sizing station, according to the present invention.

The sizing station 36 is shown in FIG. 6 and includes sizing rolls 134, 136 which are bearing-mounted to the housing 142 and individually driven by gear motors 138 and 140, respectively. The gear motors 138, 140 are electronically synchronized to maintain constant speed and control symmetrical position of tooling 150 that is attached to each of the tops and bottoms of rolls 134 and 136. The tooling 150 of rolls 134 and 136 has the proper geometry, which causes the tapered tube section 40 to be squeezed past the point of its yield strength so that a cross section that is perpendicular to the CL through the tube section, at any point along the length of tube section 40 is circular. The circumference of each tooling set (top and bottom) corresponds with the length of the tapered tube section that will be sized.

The removal station 42 of the tapered tube section manufacturing apparatus 22 consists of a powered roll conveyor 152 equipped with lift-off arms (not shown) to remove the finished (welded and sized) tapered tube section 40 onto a skid table or any other supporting structure to accommodate present product well known in the art as material handling accessories.

In the embodiments previously described and shown in FIGS. 3, 5 and 6, the tooling 148 and 150 attached to the squeeze rolls 60, 62 and sizing rolls 134, 136 enables the tapered tube manufacturing apparatus 22 to process the unwelded tapered tube section 16 and the welded tube section 40.

Figures 10, 11, 12:
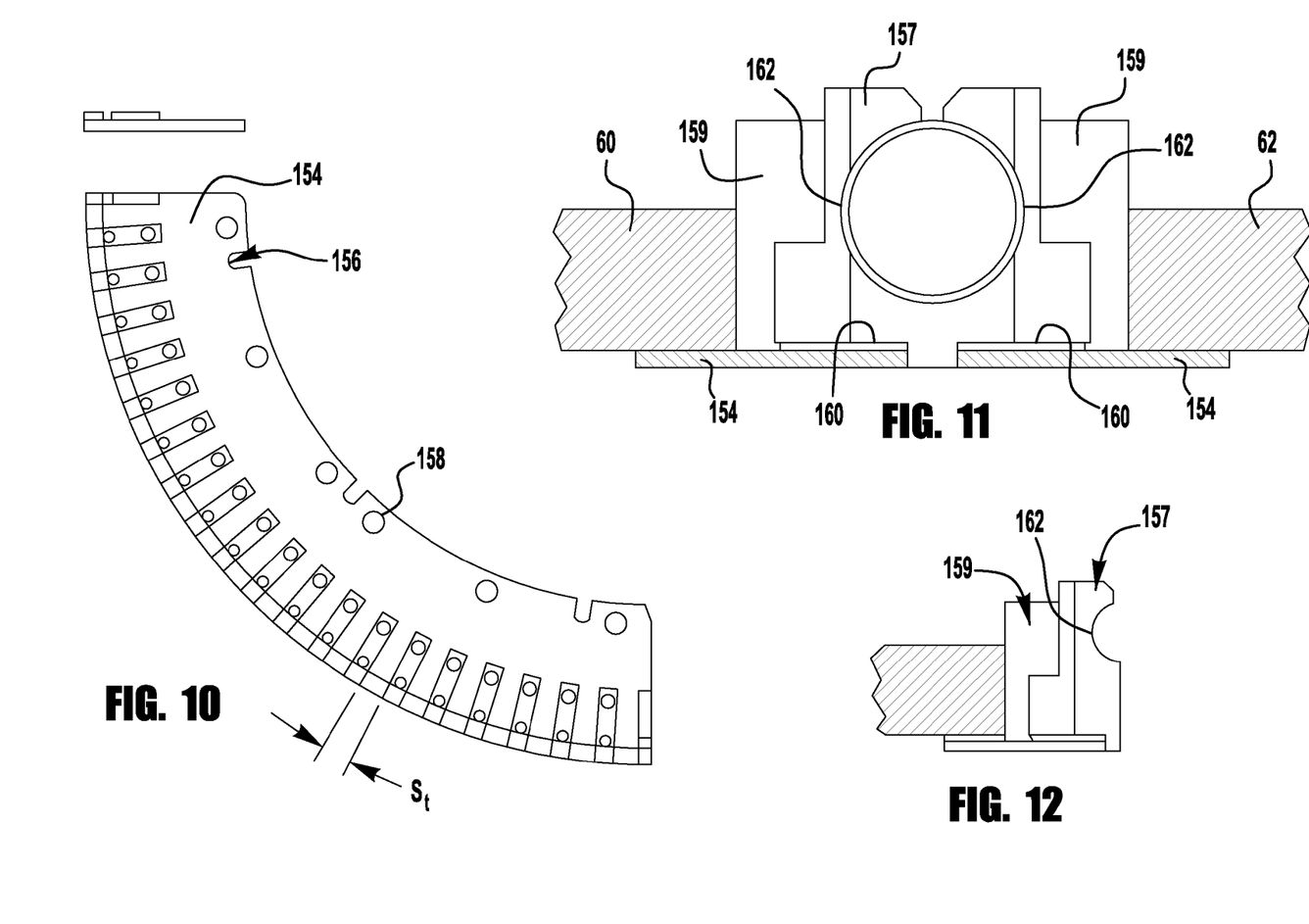
FIG. 10 shows a tool base with a series of location and attachment places, according to the present invention.
FIG. 11 shows a plurality of master plates, according to the present invention.
FIG. 12 shows a single master plate with a smaller radius than those in FIG. 11.

The tooling 150, illustrated in FIGS. 10, 11 and 12, includes a tool base 154 with a series of location and attachment places such as slots 156 and holes 158. The slots and holes are used to mount the tool base to the tool mounting surface of the squeeze rolls 60, 62 and sizing rolls 134, 136 as shown in FIG. 10. Numbering of these slots and holes provides a universal pattern on the tool mounting surface of the squeeze rolls 60, 62 and sizing rolls 134, 136 that makes it applicable for any tool of the tube manufacturing apparatus 22 capability regardless of size and shape of the tapered tube section. The combination of master plates 157 and intermediate plates 159 provide the work face for squeeze rolls 60, 62 and sizing rolls 134,136. Each master plate 157 is fastened to the pads 160 of tool base 154 between two intermediate plates 159 that are affixed to the tool base 154. Note that there are a plurality of master plates 157 disposed about the squeeze rolls 60, 62 and sizing rolls 134, 136. Each master plate 157 has a radial contour 162, which is mirror arrangement of the radial contour of the master plate located on the opposite facing surface of squeeze rolls 60, 62 or sizing rolls 134, 136. The size of the contour changes to accommodate the tapered tube shape moving through the squeeze rolls 60, 62 or sizing rolls 134, 136.

The combination of radial contours 162 which are a mirror arrangement of the radial contours of the master plate located on the opposite facing surface of squeeze rolls 60, 62 or sizing rolls 134, 136 creates a circular opening with a diameter that that is between about 94% to 98% of a diameter through the tapered tube section 16 with an open seam or the welded tapered tube section 40. See FIG. 11. Being that the diameter of the circular opening is slightly less than the diameter of the tapered tube shapes 16 and 40, the movement of the tube shapes though the circular opening generates a required pressure for the weld fusion downstream from the weld unit 104 or through the sizing station 36. Each intermediate plate 159 provides support pressure and the radius of the radial contour continues to change, i.e. get larger so as to follow the tapered tube section to the next master plate 157. See FIGS. 11 and 12. The design of the tool will ensure that each master plate 157 will be clamped under process pressure between two neighboring intermediate plates 159. This will prevent the radial movement of master plates 157 towards the shafts through the center of squeeze rolls 60, 62 or sizing rolls 134, 136. The master plates 157 as well as the intermediate plates 159 can be hardened for wear resistance.

Figure 13:
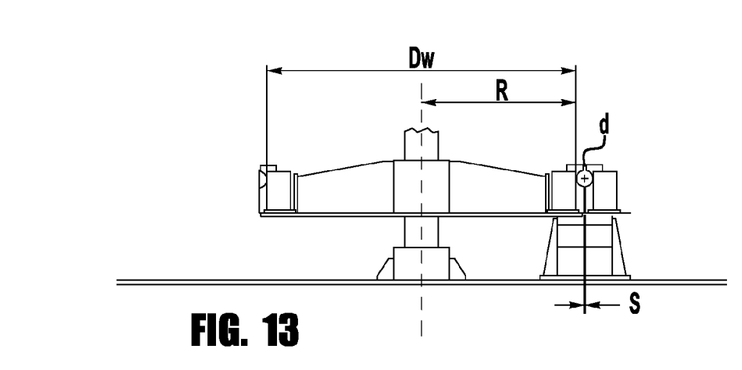
FIG. 13 shows weld roll work diameter as a function between tool base radius, the distance between rolls, and the master plate squeeze diameter, according to the present invention.
Figure 14:
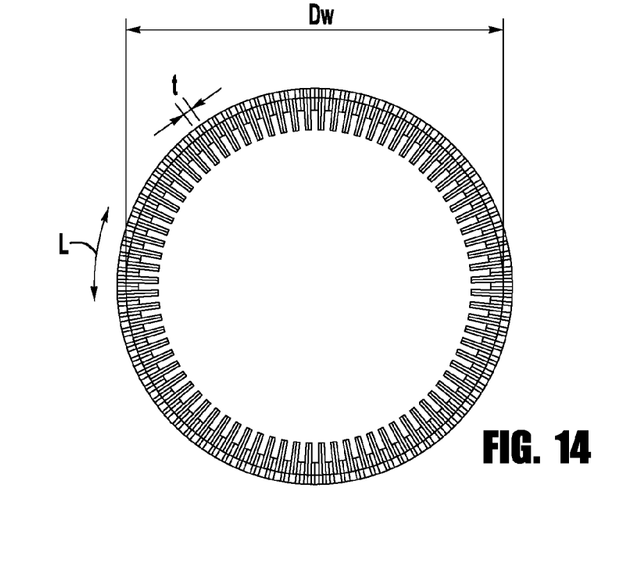
FIG. 14 shows the spacing between master plates is a function between roll circumference, the thickness of master plates, and the number of master plates per roll.
Figure 15:
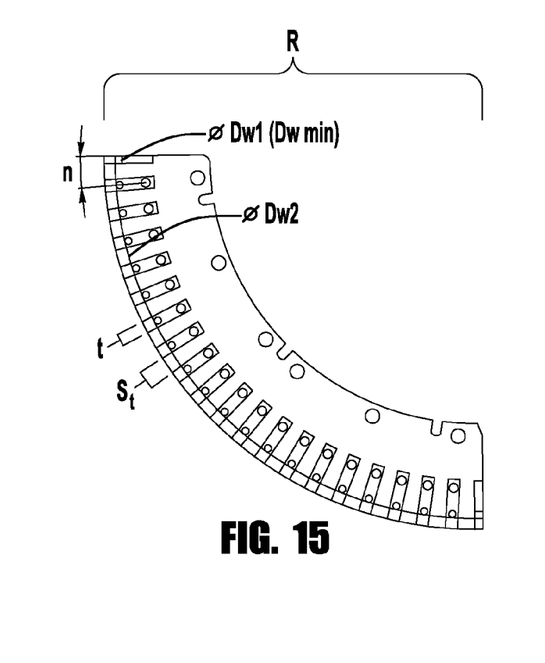
FIG. 15 shows that the incremental difference between master plate squeeze diameters is a function between roll work diameter at small and large ends of the tapered tube section and the number of master plates.

The formulas and equations hereinafter are for the tooling and roll (squeeze or sizing) geometry. The formula for weld roll work diameter is a function between tool base radius R, distance between rolls, and master plate squeeze diameter d. Formula 1 is used to determine spacing between master plates and is a function between roll circumference L, thickness of master plate t, number of master plates per roll N. Formula 2 provides that an incremental difference between master plate squeeze diameters is a function between the roll work diameter at small and large ends of the tapered tube section and the number of master plates n per initial angle of the roll.

Formula 1
Roll work Diameter (Dw);
$Dw = 2 \times [r + s/2] - d/2]$
r—tool base radius
s—distance between rolls at the bottom
d—master plate squeeze diameter Formula 2
Master plate spacing (St):
$St = [L - (t \times N)]/(N-1)$
L—roll circumference, $L = Dw \times ?$ (inches)
t—master plate thickness
N—number of master plates per roll Formula 3
Incremental difference between master squeeze diameters (Sd):
$Sd = (Dw_1 - Dw_2)/N$
$Dw_1$—roll work diameter at large end
$Dw_2$—roll work diameter at small end
$R_1$—roll work radius at large end
$R_2$—roll work radius at small end
Number of master plates per initial angle (N):
$N = Dw_1/Dw_2 \text{ min} = R_1/R_2 \text{ min}$ The Formula 1 for weld roll work diameter is a function between tool base radius r, distance between rolls, and master plate squeeze diameter d.

Formula 2 is used to determine the spacing between master plates and is a function between roll circumference L, thickness of master plate t, number of master plates per roll N.

Formula 3 provides an incremental difference between master plate squeeze diameters and is a function between roll work diameter at small and large ends of the tapered tube section and the number of master plates (n) per initial angle of the roll.

Accordingly, the improved tapered tube section manufacturing apparatus and process with a number of novel mechanisms and approaches in technology provides an effective, inexpensive and efficient manufacturing cell which achieves all the enumerated aspects, provides for eliminating disadvantages encountered with prior apparatuses, devices and processes, and obtains new directions in technology and new results in the art.

Having now described the features, discoveries and principles of the invention, the manner in which the tapered tube section manufacturing apparatus and process is constructed and used, the characteristics of the construction, and the advantageous, new and useful results obtained; the new and useful structures, devices, elements, arrangements, parts and combinations in engineering art, are set forth in the following claims.

What is claimed is:

1. A tapered tube manufacturing apparatus, comprising:
an entry station adapted to receive a tapered tube having an open, longitudinal seam with spaced longitudinal edges extending the length of the tapered tube;
a feed line section moving the tapered tube from the entry section into a welding station while maintaining the longitudinal seam coincident with a pass center line which defines a direction of movement of the tapered tube through the entry station, the feed line section and the welding station;
a pair of squeeze rolls in the welding station for moving the tapered tube through the welding station where the edges of the seam are heated, squeezing the open seam closed for welding the edges of the seam together, and moving the welded tapered tube into a cooling and transition station while maintaining the welded seam coincident with the pass center line;
a pair of sizing rolls for moving the welded tapered tube from the cooling and transition station and through the sizing station so that a centerline extending longitudinally through the center of the welded tapered tube is coincident with the direction of movement of the welded tapered tube through the sizing station and the welded tapered tube is squeezed so that all cross sections of the welded tapered tube that are perpendicular to the centerline at any point along the length of tube, have the same shape.

2. The tapered tube manufacturing apparatus of claim 1 wherein the entry station includes a pusher mechanism for pushing the tapered tube having an open longitudinal seam into the squeeze rolls in the welding station.

3. The tapered tube manufacturing apparatus of claim 2 wherein the entry station further includes a conveyor to support the tapered tube as it moves into the feed line section.

4. The tapered tube manufacturing apparatus of claim 1 wherein the feed line section includes
a fin plate substantially
as long as the tube and disposed between the open edges of the open seam so as to maintain the longitudinal seam coincident with a pass center line.

5. The tapered tube manufacturing apparatus of claim 4 wherein the fin plate includes a flange disposed within the tube to support the tube along its length.

6. The tapered tube manufacturing apparatus of claim 1 wherein
each of the squeeze rolls has tooling located around its circumference forming a radial contour, which is mirror arrangement of the radial contour of the tooling located on an opposite facing surface of the other squeeze rolls or sizing rolls.

7. The tapered tube manufacturing apparatus of claim 6 wherein
the size of the radial contour of the tooling located on each of the opposite facing surfaces of the other squeeze rolls changes to accommodate the tapered tube shape moving through the squeeze rolls.

8. The tapered tube manufacturing apparatus of claim 7 wherein
the radial contours of the master plate located on the opposite facing surface of squeeze rolls create a circular opening with a diameter that that is between about 94% to 98% of a diameter through the tapered tube section with an open seam.

9. The tapered tube manufacturing apparatus of claim 8 wherein
the welding station includes an induction heating system for heating the edges of the open, longitudinal seam whereby movement of the tapered tube through the squeeze rolls causes the edges to be welded together.

10. The tapered tube manufacturing apparatus of claim 1 wherein the cooling and transition station includes a clamp cart to support an end of the welded tapered tube section as the tapered tube section moves into the cooling and transition station and then releases the welded tapered tube section after the welding operation is completed.

11. The tapered tube manufacturing apparatus of claim 10 wherein the cooling and transition station includes a pusher plate to push the welded tapered tube section forward to the sizing station; and
a support roll to position the welded tapered tube section so that the longitudinal centerline through the length of the welded tapered tube section will align with the line of movement through the tapered tube manufacturing apparatus.

12. The tapered tube manufacturing apparatus of claim 1 wherein each of the sizing rolls has tooling located around its circumference forming a radial contour, which is a mirror arrangement of the radial contour of the tooling located on an opposite facing surface of the other sizing rolls.

13. The tapered tube manufacturing apparatus of claim 12 wherein the size of the radial contour of the tooling located on each of the sizing rolls squeeze rolls changes to accommodate the tapered welded tube shape moving through the squeeze rolls.

14. The tapered tube manufacturing apparatus of claim 13 wherein the radial contours of the master plate located on the opposite facing surface of sizing rolls creates a circular opening with a diameter that is between about 94% to 98% of a diameter through the tapered welded tube section.

15. A method for manufacturing a tapered tube, comprising the steps:
moving a tapered tube having an open longitudinal seam with spaced longitudinal edges extending the length of the tapered tube through an entry station;
moving the tapered tube from the entry section into a welding station while maintain the open longitudinal seam of the tapered tube coincident with a pass center line which defines the direction of movement of the tapered tube through the entry station and the welding station;
squeezing the open seam closed and welding the edges of the seam together;
moving the welded tapered tube through a cooling and transition station while maintaining the movement of the welded tapered tube so that the welded seam is coincident with the pass center line;
moving the welded tapered tube through a sizing station with a pair of sizing rolls so that a centerline extending longitudinally through the center of the welded tapered tube is coincident with the direction of movement of the tapered tube through the sizing station; and
squeezing the welded tapered tube in the sizing station so that a cross section of the welded tapered tube that is perpendicular to the centerline at any point along the length of tube, is circular.

16. The method of claim 15 including the step of pushing the tapered tube having an open longitudinal seam into the squeeze rolls in the welding station.

17. The method of claim 15 including the step of changing the size of the radial contour of the tooling located on each of the opposite facing surfaces of the squeeze rolls to accommodate the tapered tube shape moving through the squeeze rolls.

18. The method of claim 15 including the steps of:
heating the edges of the open, longitudinal seam: and
welding the edges together by moving the tapered tube having an open longitudinal seam through squeeze rolls.

19. The method of claim 15 including the step of including the step of positioning the welded tapered tube section in the cooling and transition station so that the longitudinal centerline through the length of the welded tapered tube section will align with the line of movement through the tapered tube manufacturing apparatus.

20. The method of claim 15 including the step of changing the size of the radial contour of the tooling located on each of the sizing rolls to accommodate the tapered welded tube shape moving through the sizing rolls.

* * * * *